United States Patent [19]
Johnston

[11] Patent Number: 5,450,764
[45] Date of Patent: Sep. 19, 1995

[54] DISPLACEMENT SENSOR

[75] Inventor: James S. Johnston, Bognor Regis, United Kingdom

[73] Assignee: Fisher-Rosemount Ltd., West Sussex, United Kingdom

[21] Appl. No.: 187,195

[22] Filed: Jan. 26, 1994

[30] Foreign Application Priority Data

Feb. 9, 1993 [GB] United Kingdom ............... 9302530

[51] Int. Cl.⁶ .......................................... G01B 21/00
[52] U.S. Cl. ........................... 73/865.9; 324/207.24; 356/373
[58] Field of Search ................... 73/865.9, 865.8; 324/207.24; 356/373

[56] References Cited

U.S. PATENT DOCUMENTS

| | | | |
|---|---|---|---|
| 3,065,635 | 9/1962 | Keller | 73/319 |
| 3,260,110 | 7/1966 | Lutz | 73/209 |
| 4,194,397 | 3/1980 | Yasuda | 73/314 |
| 4,457,171 | 7/1984 | Gebauer | 73/305 |
| 4,477,726 | 10/1984 | Reichi | 250/237 |
| 4,637,254 | 1/1987 | Dyben et al. | 73/314 |
| 5,074,053 | 12/1991 | West | 33/708 |

FOREIGN PATENT DOCUMENTS

| | | |
|---|---|---|
| 0421401A1 | 4/1991 | European Pat. Off. |
| 1513981 | 6/1978 | United Kingdom |
| 2078970 | 1/1982 | United Kingdom |

OTHER PUBLICATIONS

*Patent Abstracts of Japan;* Grp P716, vol. 12, No. 205, "Shape Measuring Method for Cold-Rolled Steel Sheet", Abs. pub. date Jun. 14, 1988, (abstract of Japanese Patent No. 63–8503).

*Primary Examiner*—Thomas P. Noland
*Attorney, Agent, or Firm*—Westman, Champlin & Kelly

[57] ABSTRACT

A sensor (1) for sensing the displacement of a body (12) comprises a deformable strip (2) enclosed in a chamber 3. The strip is constrained under longitudinal and transverse constraint such that end portions (9, 10) of the strip are parallel to a direction of movement of the body, the strip being locally deformed in the form of an S-bend. A magnet operable between the strip and the body varies the location of the S-bend along the length of the strip according to the position of the body. Optical or electronic sensors are provided for indicating the sensed position. The sensor may be used for sensing liquid levels or displacement of moving bodies such as valve elements particularly in hazardous environments including aircraft.

22 Claims, 3 Drawing Sheets

DISPLACEMENT SENSOR

BACKGROUND OF THE INVENTION

This invention relates to a sensor for sensing the displacement of a body and in particular to a sensor which is suitable for use in hostile environments where direct contact with the body is undesirable.

It is known for displacement to be sensed using a follower device such as disclosed in U.S. Pat. No. 3,065,635 in which a magnetic follower is isolated from the body but moves in unison with the body by virtue of magnetic coupling. The displacement of the follower device is then taken as an indication of the body's displacement.

Such sensors have particular application to measurement of liquid levels where the body constitutes a float.

It is also known from U.S. Pat. No. 4,637,254 to provide a position sensor in which a deformable strip adopts an S-bend configuration at a localized position along its length and the position at which the S-bend is formed is determined by the position of a body whose displacement is to be sensed. The position at which the S-bend is formed is then detected as an indication of body position. A disadvantage of this system is that the body is biased into contact with the strip in order to deform the strip and a flexible seal arrangement is required to protect the sensor from the environment in which the body is movable.

SUMMARY OF THE INVENTION

According to the present invention there is disclosed a sensor for sensing the displacement of a body comprising a deformable strip, a rigid enclosure defining a chamber within which the strip is received and isolating the strip from contact with the body, constraining means operable to maintain the strip under longitudinal and transverse constraint such that first and second end portions of the strip extend substantially parallel to a longitudinal direction in which the body is movable relative to the sensor and locally deforming the strip in a transverse direction orthogonal to the first and second portions such that a deformed portion in the form of an S-bend integrally and unitarily connects the first and second end portions, and first magnetic means operable between the strip and the body to apply a magnetic force non-uniformly to the strip such that the location at which the strip is deformed to constitute the deformed portion is longitudinally variable in registration with a reference portion of the body whereby the longitudinal displacement of the deformed portion is representative of the displacement of the body.

An advantage of such an arrangement is that the rigid enclosure avoids the need for any flexible seal arrangement and no contact is made between the body and the strip thereby reducing frictional drag effects on body movement.

Preferably the strip is comprised of ferromagnetic material and the body comprises a magnetic element arranged in closer proximity to the first end portion than to the second end portion thereby constituting the first magnetic means.

Conveniently the length of the length of the chamber is less than the undeformed length of the strip whereby end walls of the enclosure constitute longitudinally constraining elements of the constraining means.

Preferably the enclosure comprises longitudinally extending first and second walls contacted by the respective first and second end portions of the strip and wherein the first magnetic means is operable to bias the first end portion into contact with the first wall.

Preferably the sensor further comprises biasing means operable to bias the second end portion into co-planar contact with the second wall.

The biasing means may comprise a second magnetic means operable to apply substantially uniformly to the strip a magnetic force in opposition to and of smaller magnitude than the magnetic force applied by the first magnetic means.

Alternatively the biasing means may comprise electrostatic means operable to apply an electrostatic force in opposition to and of lesser magnitude than the magnetic force applied by the first magnetic means.

Alternatively the biasing means may comprise a clamp operable on the second linear portion to apply a transverse deformation such that the second linear portion exhibits an arcuate profile when viewed in longitudinal projection.

Conveniently the magnetic element extends longitudinally in a direction parallel to the direction of motion and wherein the magnetic element is transversely magnetized along its length.

Advantageously the enclosure comprises a window through which the strip is visible.

The chamber may be filled with a liquid. Where an opaque liquid is used in combination with a transparent window against which the second end portion of the strip is biased, the strip will be visible to the extent that it is in contact with the transparent wall and thereby provides a visible indicator of the position of the deformed portion. A viscous liquid within the chamber may also be utilized to provide damping.

The sensor may further comprise sensing means operable to sense the position of the deformed portion and to produce an electrical signal representative of the longitudinal displacement of the deformed portion.

Preferably the sensing means comprises at least one electrode associated with the enclosure and wherein the sensing means is operable to produce an electronic signal responsive to the capacitance between the electrode and the strip.

Alternatively the sensing means may comprise two or more inductive elements associated with the enclosure and wherein the sensing means is operable to produce an electronic signal responsive to inductive coupling between the elements.

Alternatively the sensing means may comprise a transmitter of electromagnetic radiation operable to transmit longitudinally through the chamber, a detector operable to detect reflective radiation, ranging means operable to generate an output signal representative of the range at which the radiation is reflected and reflecting means associated with the deformed portion whereby the output signal is representative of the displacement of the deformed portion.

In such an arrangement the constraining means may conveniently be arranged to induce an S-bend at the deformed portion in which the strip is deformed through substantially 90° relative to its longitudinal extent.

The sensing means may alternatively comprise a longitudinally extending fluorescent light guide, the sensor further comprising a light source operable to illuminate the deformed portion and an optical detector operable to produce a signal representative of the longitudinal location of the light guide at which the fluorescence is detected.

In such an arrangement the constraining means is preferably operable to deform the strip such that the strip is deformed through substantially 45° at the S-bend whereby a longitudinally directed light beam is transversely deflected through substantially 90° at the deformed portion.

The sensing means may alternatively comprise a scale extending longitudinally of the enclosure and optical reading means operable to read the portion of scale in registration with the deformed portion.

In such an arrangement the scale may comprise markings applied to the strip and wherein the deformed portion comprises an S-bend in which the strip is bent through substantially 90° relative to its longitudinal extent.

The scale may alternatively comprise markings applied to a wall of the enclosure and wherein the deformed portion comprises an S-bend in which the strip is bent through substantially 45° relative to its longitudinal extent.

In such an arrangement the optical detector comprises one or more lenses or mirrors mounted on a sledge coupled to the strip so as to be localized to and movable with the deformed portion.

BRIEF DESCRIPTION OF THE DRAWINGS

Preferred embodiments of the present invention will now be described by way of example only and with reference to the accompanying drawings of which.

DESCRIPTION OF THE PREFERRED EMBODIMENTS

Figure 1:
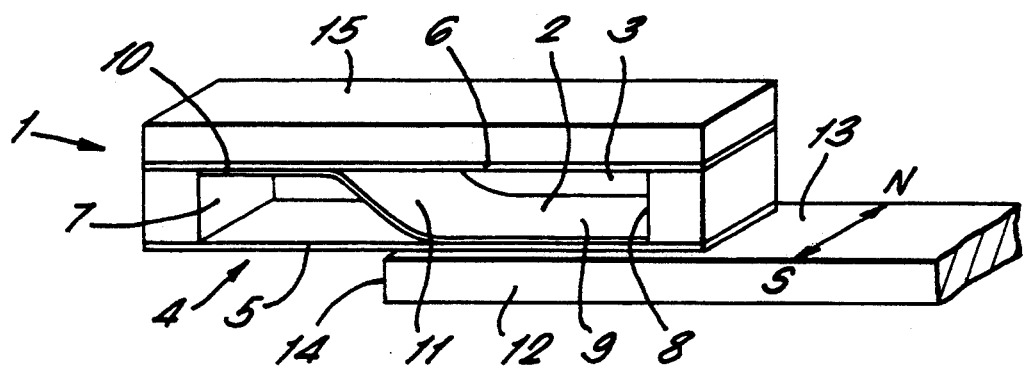
FIG. 1 is a schematic perspective view of a sensor in accordance with the present invention in which the strip is magnetically biased.

In describing the following embodiments, the same reference numerals will be used where appropriate for corresponding elements of different embodiments.

In FIG. 1 a sensor 1 comprises a deformable strip 2 of resilient ferromagnetic sheet material which extends longitudinally within a chamber 3 defined by an enclosure 4. The enclosure 4 is generally rectangular having opposite and parallel first and second walls 5 and 6 respectively extending horizontally with the second wall uppermost and side walls (not shown) which are removed in the drawing for clarity. The chamber is bounded by end walls 7 and 8 against which the ends of the strip 2 abut, the end walls 7 and 8 being longitudinally spaced apart by a distance which is less than that required to allow the strip to extend linearly to its full extent so that, in order to accommodate the strip within the chamber 3, the strip must be deformed.

The shape adopted by the strip 2 is such that a first portion 9 extends linearly in contact with the first wall 5 and extends into abutment with end wall 8. A second portion 10 extends linearly in contact with the second wall 6 so as to extend parallel to and spaced above the first portion 9 and extends longitudinally into abutment with end wall 7. A deformed portion 11 connects the first and second portions 9 and 10, the first, second and deformed portions thereby being formed integrally and unitarily and merging smoothly from one to the other.

The enclosure 4 provides longitudinal constraint upon the strip 2 by virtue of the abutting end faces 7 and 8 which restrict the longitudinal extent of the strip and furthermore the enclosure provides transverse constraint in a direction orthogonal to the walls 5 and 6 and to the plane of the strip by virtue of the first and second walls 5 and 6 being spaced apart by a fixed distance determined by the end walls 7 and 8. The position at which the strip 2 is deformed to constitute the localized deformed portion 11 is not uniquely determined by this constraint and by applying an external force to the strip it is possible to shift the location of the deformed portion longitudinally in a continuously variable manner between the end walls 7 and 8. In referring to the first, second and deformed portions 9, 10 and 11 therefore it is to be understood that these references apply to the instantaneous shape of the strip 2 since for example an element of the strip at its mid-point could at various times lie within the first portion, the second portion or the deformed portion depending on the location of the S-bend induced by constraining the strip.

A magnetic element 12 constituting part of a body whose position is to be sensed has a major surface 13 exending parallel to and in proximity with the first wall 5 of the enclosure 4. The magnetic element 12 is longitudinally displaceable by movement of the body in a direction parallel to the longitudinal extent of the enclosure 4 and the strip 2 and the enclosure is positioned such that the available range of movement of a leading edge 14 of the element 12 lies between limits which are between the end walls 6 and 7 and which are inwardly spaced from the end walls by at least the longitudinal extent of the deformed portion.

The magnetic element 12 is permanently magnetized in a transverse direction parallel to the end walls 6 and 7 such that the strip 2 is magnetically attracted towards the element by a magnetic force which in the orientation of FIG. 1 is directed vertically downwards.

Consequently the first portion 9 of the strip 2 is biased by the magnetic force in a downward direction and rests in linear contact with the first wall 5.

A second magnetic element 15 is located externally of the enclosure 4 adjacent the second wall 6 and is permanently magnetized in the same sense as the first magnetic element 12 but to a lesser strength. Consequently a weaker attractive magnetic force acts vertically upwardly on the strip so that the second portion 10 of the strip is biased vertically upwards and rests in linear contact with the second wall 6.

The deformed portion 11 is constrained to extend between the first and second portions 9 and 10 at a location which is longitudinally localized in registration with the leading edge 14.

Longitudinal displacement of the element 12 to the left or right as viewed in FIG. 1 will be accompanied by movement of the strip such that the deformed portion 11 remains in registration with the leading edge 14. The longitudinal displacement of the deformed portion 11 is therefore representative of the longitudinal displacement of the body associated with the magnetic element 12. The position of a body may thereby be sensed using the arrangement of FIG. 1 by attaching such a magnetic element 12 to the body in proximity with the sensor 1.

The position of the deformed portion 11 may be visually observed by providing the enclosure 4 with a suitable window which preferably provides viewing through the second wall 6. The chamber 3 may if required be filled with an opaque liquid such that a visual demarcation is viewable in the window between that portion of the window contacted by the strip 2 and that portion which is separated from the strip and therefore contacted by opaque liquid. Various arrangements of illuminating such an enclosure and providing measurement scales can also be incorporated into such a sensor.

The second magnetic element 15 may alternatively be replaced by an electrode to which an electrostatic charge is applied by a suitable circuit in order to provide electrostatic attraction between the strip 2 and the electrode in a direction which will bias the strip into contact with the second wall 6.

The magnetic element 12 in a further alternative arrangement may comprise a magnetized portion located at the leading edge 14 of sufficient strength to obviate the need for the element to be magnetized along its entire length.

Figure 2:
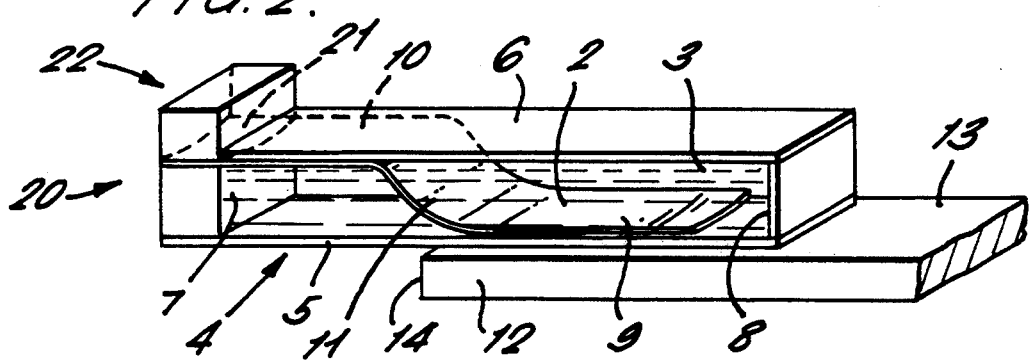
FIG. 2 is a schematic perspective view of an alternative embodiment in which the strip is biased by means of being clamped in curvilinear profile.

An alternative embodiment is shown in FIG. 2 in which an alternative sensor 20 has a strip 2 which is resiliently deformed so as to remain biased into contact with the second wall 6. An end portion 21 of the second portion 10 of the strip is held in a clamp 22 which grips the end portion such that it is deformed into adopting an arcuate profile as viewed in longitudinal projection. The strip 2 will then tend to remain biased against the second wall 6 in opposition to the downward magnetic force applied by the magnetic element 12. The second wall 6 is formed of transparent material constituting a window through which the strip 2 can be observed and the chamber 3 is filled with opaque liquid.

The position of the deformed portion 11 may be sensed by other means instead of or in addition to visual means. The first and second walls 5 and 6 may for example comprise insulated conducting plates. By connecting the plates and the strip to a suitable circuit the capacitances $C_1$ and $C_2$ between the first plate and the strip and between the second plate and the strip respectively can be sensed and compared. An output representative of $C_1/(C_1+C_2)$ will for example provide a signal representative of the fractional distance from one end at which the deformed portion is located.

Figure 3:
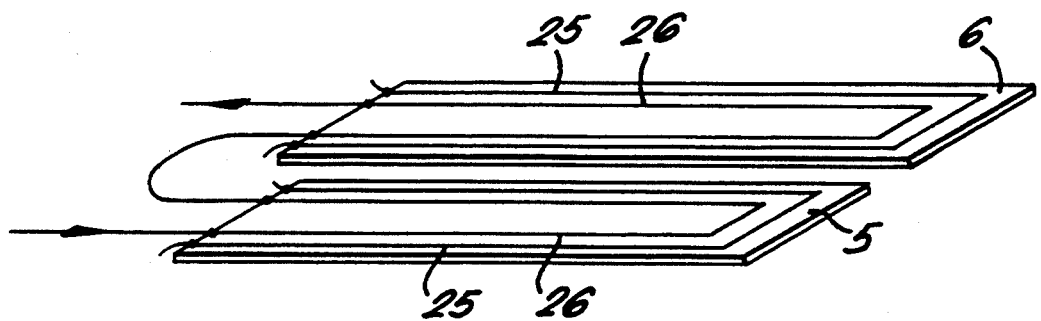
FIG. 3 is a schematic perspective view of inductive elements of a means for sensing the longitudinal displacement of the deformed portion of the strip.

FIG. 3 illustrates a further alternative means of sensing the position of the deformed portion 11. Conductive tracks 25 and 26 are arranged to extend in coaxial loops over the first and second walls 5 and 6, the tracks being arranged such that magnetic flux generated by current through one track will be coupled to the second track. By connecting the tracks to a suitable circuit and energizing one track with an alternating current the inductive coupling between the tracks can be sensed and will be influenced by the proximity of the electromagnetic strip (not shown in FIG. 3 for clarity).

Figure 4:
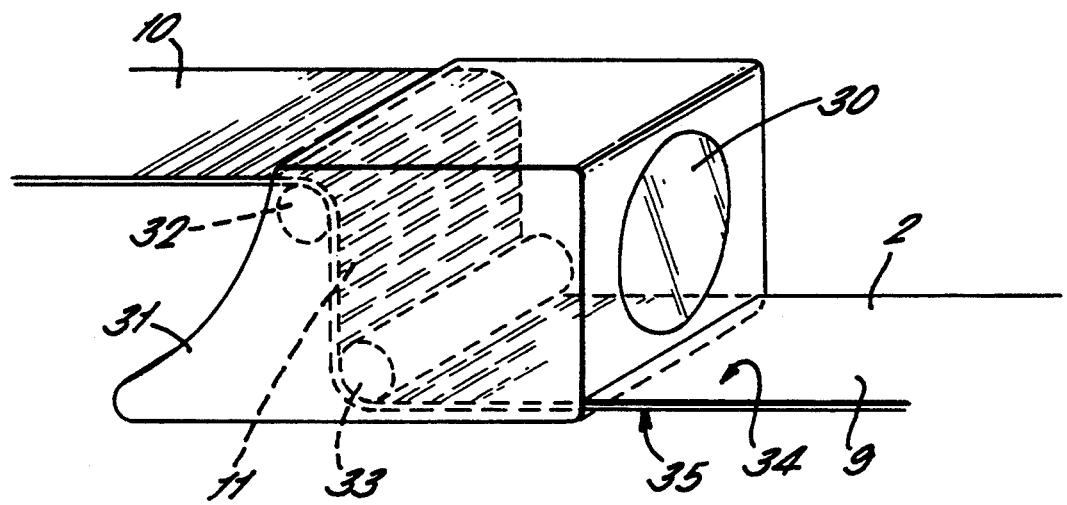
FIG. 4 is a perspective view of detail of a further alternative embodiment in which a scale on the strip is optically read.
Figure 6:
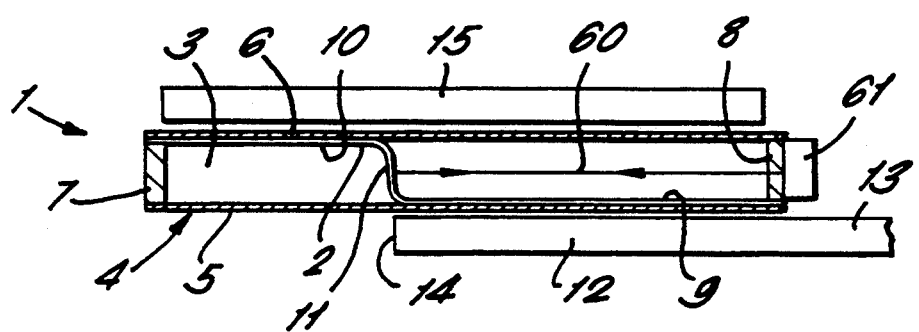
FIG. 6 is a schematic sectioned elevation of a further alternative embodiment in which a sensing means comprises a light transmitter and receiver and wherein the strip is deformed through 90°.

The strip 2 may itself be marked with a scale which can be read by a detector arranged to read only that portion of the scale corresponding to the deformed portion 11. An optical arrangement using light or non-visible radiation can be arranged such that an illuminating beam is passed longitudinally through the chamber 3 so as to be incident upon the deformed portion 11 as illustrated schematically in FIG. 6 where a light beam 60 is shown being transmitted and received from a transducer 61. In the arrangement of FIG. 6 the strip is constrained such that its S-bend configuration deforms the strip to a maximum deflection of 90° relative to the longitudinal extent. There is therefore a central portion of the deformed portion 11 which is substantially at 90° to the light beam 60 thereby enabling light to be returned to the transducer. The scale illuminated at the deformed portion 11 may be read by a suitable optical arrangement. The effectiveness of such reading techniques will be enhanced by increasing the size of that reflective part of the strip 2 which is maintained at substantially 90° to the longitudinal extent of the strip and further improved by providing a positive powered lens in proximity with the scale to be read. In such an arrangement it is therefore advantageous to utilize a movable lens element 30 as illustrated in FIG. 4 which is mounted on a carrier 31 arranged to move the lens element in unison with the deformed portion 11.

The carrier 31 is mounted for sliding movement longitudinally of the chamber and includes first and second guide rollers 32 and 33 which engage and guide the strip 2 in a manner which constrains the deformed portion 11 to extend linearly between the guide rollers in a direction orthogonal to the walls 5 and 6 and hence orthogonally to the beam 60.

The guide rollers 32 and 33 are arranged to contact upper and lower surfaces 34 and 35 respectively of the strip and are spaced apart in a direction orthogonal to the plane of the strip so as to constrain the strip into its deformed state. The carrier 31 is formed of a low friction material which in the preferred embodiment is PTFE so that sliding contact with the walls of the enclosure 4 incurs minimal resistive drag.

Scale markings 36 applied to the strip 2 provide a binary code which for each illuminated portion of the scale markings uniquely defines the position of the illuminated portion with respect to the longitudinal extent of the scale. In the preferred embodiment the scale is represented by a pseudo random binary sequence of black and white bars. Alternative codes such as Gray code may be utilized.

Such a scale may alternatively be applied to the second wall 6 and may be read by illuminating a portion of the scale using a beam which is deflected from the deformed portion through 90°. Such an arrangement requires the deformed portion to extend at substantially 45° to the longitudinal extent of the enclosure. This can be accommodated by suitable spacing of the end walls 7 and 8. The area available for reflection may be enhanced by using a carrier 31 in which the guide rollers 32 and 33 are offset in longitudinal position so as to dispose a substantially planar surface of the deformed portion 11 extending at 45° relative to the longitudinal extent.

Figure 7:
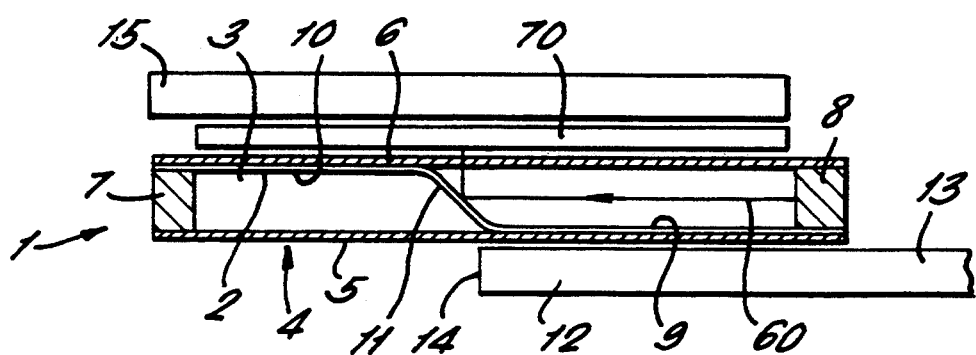
FIG. 7 is a schematic sectioned elevation of a further alternative embodiment in which a sensing means is a longitudinally extending fluorescent light guide and the strip is deformed through 45°.

Such deflection through 90° may alternatively be utilized in an arrangement shown in FIG. 7 in which a fluorescent light guide 70 is placed along the second wall 6 and is illuminated by means of a longitudinally directed beam 60 which is reflected through 90° so as to be incident upon the light guide in registration with the deformed portion 11. The location along the light guide 70 at which fluorescence occurs is thereby representative of the position of the deformed portion 11 and may be visually or otherwise sensed to provide an indication of the displacement of the body.

A further alternative method of sensing the displacement of the deformed portion utilizes an arrangement of the type shown in FIG. 6 in which a light beam 60 transmitted so as to be reflected from the deformed portion is detected by a transducer 61 of an optical ranging device utilized to sense the range of the deformed portion from the transducer. A signal representative of the range is therefore representative of the position of the deformed portion 11 and hence is representative of the displacement of the body.

Figure 5:
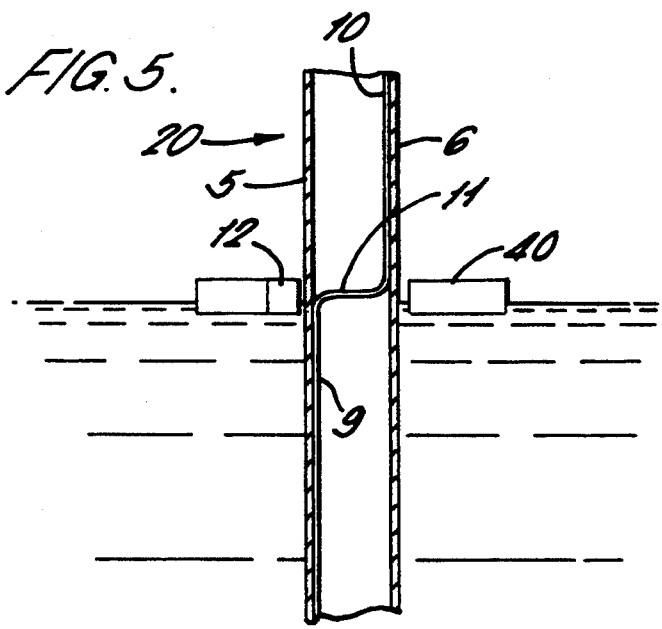
FIG. 5 is a schematic view of a further alternative embodiment in which the body is a float which is movable to indicate a liquid level.

Sensors of the type disclosed above have numerous applications such as the sensing of liquid level as illustrated schematically in FIG. 5. A float 40 is arranged to be vertically movable on the liquid surface and in proximity with the enclosure 4. The strip 2 received within the enclosure has a deformed portion 11 which moves in registration with a magnetic element 12 forming part of the float.

The position of the deformed portion 11 may be sensed by any of the techniques referred to above to provide a liquid level measurement.

The use of an enclosure which seals the chamber 3 containing the strip 2 from external environments renders the sensor particularly useful for applications in aircraft for measurement of liquid levels and displacement of other moving bodies. Valve position elements may also be remotely sensed using such sensors.

The chamber 3 may be filled with a suitable damping fluid to remove vibration effects should this be necessary in a particular environment.

The magnetic means associated with the body may alternatively comprise an electromagnet.

Alternatively the strip itself may be permanently magnetized and the magnetic means associated with the body may be a ferromagnetic element which is acted upon by the strip.

In a further alternative, the strip may be placed in the field of a fixed permanent magnet, a soft iron element being associated with the body so as to distort the field in a manner which is depended on displacement.

I claim:

1. A sensor for sensing the displacement of a body comprising a deformable strip, a rigid enclosure defining a chamber within which the strip is received and isolating the strip from contact with the body, constraining means operable to maintain the strip under longitudinal and transverse constraint such that first and second end portions of the strip extend substantially parallel to a longitudinal direction in which the body is movable relative to the sensor and locally deforming the strip in a transverse direction orthogonal to the first and second portions such that a deformed portion in the form of an S-bend integrally and unitarily connects the first and second end portions, and first magnetic means operable between the strip and the body to apply a magnetic force non-uniformly to the strip such that the location at which the strip is deformed to constitute the deformed portion is longitudinally variable in registration with a reference portion of the body whereby the longitudinal displacement of the deformed portion is representative of the displacement of the body.

2. A sensor as claimed in claim 1 wherein the strip is comprised of ferromagnetic material and the body comprises a magnetic element arranged in closer proximity to the first end portion than to the second end portion thereby constituting the first magnetic means.

3. A sensor as claimed in claim 1 wherein the length of the chamber is less than the undeformed length of the strip whereby end walls of the enclosure constitute longitudinally constraining element of the constraining means.

4. A sensor as claimed in claim 1 wherein the enclosure comprises longitudinally extending first and second walls contacted by the respective first and second end portions of the strip and wherein the first magnetic means is operable to bias the first end portion into contact with the first wall.

5. A sensor as claimed in claim 4 further comprising biasing means operable to bias the second end portion into co-planar contact with the second wall.

6. A sensor as claimed in claim 5 wherein the biasing means comprises a second magnetic means operable to apply substantially uniformly to the strip a magnetic force in opposition to and of smaller magnitude than the magnetic force applied by the first magnetic means.

7. A sensor as claimed in claim 5 wherein the biasing means comprises electrostatic means operable to apply an electrostatic force in opposition to and of lesser magnitude than the magnetic force applied by the first magnetic means.

8. A sensor as claimed in claim 5 wherein the biasing means comprises a clamp operable on the second linear portion to apply a transverse deformation such that the second linear portion exhibits an arcuate profile when viewed in longitudinal projection.

9. A sensor as claimed in claim 1 wherein the magnetic element extends longitudinally in a direction parallel to the direction of motion and wherein the magnetic element is transversely magnetized along its length.

10. a sensor as claimed in claim 1 wherein the enclosure comprises a window through which the strip is visible.

11. A sensor as claimed in claim 10 wherein the chamber is filled with a liquid.

12. A sensor as claimed in claim 1 further comprising sensing means operable to sense the position of the deformed portion and to produce an electrical signal representative of the longitudinal displacement of the deformed portion.

13. A sensor as claimed in claim 12 wherein the sensing means comprises at least one electrode associated with the enclosure and wherein the sensing means is operable to produce an electronic signal responsive to the capacitance between the electrode and the strip.

14. A sensor as claimed in claim 12 wherein the sensing means comprises two or more inductive elements associated with the enclosure and wherein the sensing means is operable to produce an electronic signal responsive to inductive coupling between the elements.

15. A sensor as claimed in claim 12 wherein the sensing means comprises a transmitter of electromagnetic radiation operable to transmit longitudinally through the chamber, a detector operable to detect reflective radiation, ranging means operable to generate an output signal representative of the range at which the radiation is reflected and reflecting means associated with the deformed portion whereby the output signal is representative of the displacement of the deformed portion.

16. A sensor as claimed in claim 15 wherein the constraining means is operable to induce an S-bend at the deformed portion in which, the strip is deformed through substantially 90° relative to its longitudinal extent.

17. A sensor as claimed in claim 12 wherein the sensing means comprises a longitudinally extending fluorescent light guide, the sensor further comprising a light source operable to illuminate the deformed portion and an optical detector operable to produce a signal representative of the longitudinal location of the light guide at which the fluorescence is detected.

18. A sensor as claimed in claim 17 wherein the constraining means is operable to deform the strip such that the strip is deformed through substantially 45° at the S-bend whereby a longitudinally directed light beam is transversely deflected through substantially 90° at the deformed portion.

19. A sensor as claimed in claim 12 wherein the sensing means comprises a scale extending longitudinally of the enclosure and optical reading means operable to read the portion of scale in registration with the deformed portion.

20. A sensor as claimed in claim 19 wherein the scale comprises markings applied to the strip and wherein the deformed portion comprises an S-bend in which the strip is bent through substantially 90° relative to its longitudinal extent.

21. A sensor as claimed in claim 19 wherein the scale comprises markings applied to a wall of the enclosure and wherein the deformed portion comprises an S-bend in which the strip is bent through substantially 45° relative to its longitudinal extent.

22. A sensor as claimed in claim 21 wherein the optical detector comprises one or more lenses or mirrors mounted on a sledge coupled to the strip so as to be localized to and movable with the deformed portion.

* * * * *